(12) United States Patent  
Dushku et al.

(10) Patent No.: US 9,086,033 B2  
(45) Date of Patent: Jul. 21, 2015

(54) ADDITIVE MANUFACTURED PROPULSION SYSTEM

(75) Inventors: Matthew Dushku, Providence, UT (US); Walter Holemans, Washington, DC (US)

(73) Assignee: Experimental Propulsion Lab, LLC

( * ) Notice: Subject to any disclaimer, the term of this patent is extended or adjusted under 35 U.S.C. 154(b) by 981 days.

(21) Appl. No.: 13/231,603

(22) Filed: Sep. 13, 2011

(65) Prior Publication Data

US 2012/0060468 A1   Mar. 15, 2012

Related U.S. Application Data

(60) Provisional application No. 61/403,180, filed on Sep. 13, 2010.

(51) Int. Cl.
| | |
|---|---|
| *F02K 9/10* | (2006.01) |
| *F02K 9/32* | (2006.01) |
| *F02K 9/72* | (2006.01) |
| *F02K 9/08* | (2006.01) |
| *F02K 9/34* | (2006.01) |

(52) U.S. Cl.
CPC ... *F02K 9/08* (2013.01); *F02K 9/10* (2013.01); *F02K 9/32* (2013.01); *F02K 9/34* (2013.01); *F02K 9/72* (2013.01)

(58) Field of Classification Search
CPC ............ F05D 2230/30–2230/314; F02K 9/08; F02K 9/10; F02K 9/14; F02K 9/18; F02K 9/32; F02K 9/34; F02K 9/72
USPC ............................ 60/251, 253, 255, 257, 219
See application file for complete search history.

(56) References Cited

U.S. PATENT DOCUMENTS

2007/0261386 A1* 11/2007 Benson ............................ 60/251  
2009/0217525 A1*  9/2009 Fuller ......................... 29/890.01

* cited by examiner

*Primary Examiner* — Andrew Nguyen  
(74) *Attorney, Agent, or Firm* — Craig Metcalf; Kirton McConkie

(57) ABSTRACT

Propulsion systems and method for making a propulsion system include additively manufacturing a casing body into a single-piece structure having no bonded or bolted joints. The casing body defines a combustion chamber therein and is at least partially composed of a material useful as a solid rocket fuel and capable of being consumed during combustion. Other embodiments are also described.

9 Claims, 10 Drawing Sheets

ADDITIVE MANUFACTURED PROPULSION SYSTEM

RELATED APPLICATIONS

This application claims the benefit of U.S. Provisional Application No. 61/403,180 filed Sep. 13, 2010, entitled ADDITIVE MANUFACTURED PROPULSION SYSTEM, which is incorporated herein by reference.

FIELD

The present invention relates to propulsion systems and specifically to a propulsion system formed as a single-piece structure in an additive manufacturing process.

BACKGROUND

Propulsion systems propel objects, such as rockets and missiles. Liquid systems and solid systems are the two basic types of propulsion systems that are most generally used. In a solid propulsion system, solid rocket fuel and an oxidizer are mixed together and allowed to cure inside a rocket case to form a solid propellant material, which is then ignited in the rocket case. Upon ignition, pressure forms within the rocket case and gases are released through a nozzle to produce thrust. In a solid propellant system, the solid propellant burns uninterrupted until all the propellant is exhausted.

In a liquid system, a liquid oxidizer is fed into a combustion chamber with a liquid fuel. The oxidizer and liquid fuel are mixed in the combustion chamber, where they react to produce gases under high temperature and high pressure. The gases exhaust through a nozzle from the combustion chamber to thereby produce thrust.

Another type of propulsion system is the hybrid system, which are generally not as widely used as liquid and solid fuel systems. A hybrid system combines aspects of both liquid systems and solid systems in that one propellant is stored as a solid and another propellant is stored as a liquid. In a typical hybrid system, the solid material is used as the fuel and the liquid material is used as the oxidizer.

SUMMARY

The present invention has been developed in response to problems and needs in the art that have not yet been fully resolved by currently available propulsion system. Thus, these systems and methods are developed to provide a propulsion system and method for making a propulsion system that include additively manufacturing a casing body into a single-piece structure having no bonded or bolted joints. Using the additive manufacturing process, the resulting prolusion system can have numerous advantages over traditional propulsion systems, as described herein.

In one aspect of the invention, a propulsion system comprises: a casing body being at least partially composed of a material useful as a solid rocket fuel; a combustion chamber defined within the casing body; and a fuel chamber defined within the casing body and circumscribing at least a portion of the combustion chamber and capable of being consumed during combustion.

Implementation may include one or more of the following features. The material useful as a solid rocket fuel may include at least one of polymethyl methacrylate (PMMA), high density polyethylene (HDPE), nylon plastic, nylon, nylon reinforced with carbon fiber or glass fiber, acrylonitrile butadiene styrene (ABS) plastic, polycarbonate, polyvinyl chloride (PVC), chlorinated polyvinyl chloride (CPVC), polybutylene (PB) and polyethylene (PE), polypropylene, hydroxyl-terminated polybutadiene (HTPB), polyurethane, and a photopolymer. A combustion chamber may extend from the injector port to the nozzle. An igniter port may be disposed on a forward portion of the casing body. An injector port may be disposed on a forward portion of the casing body. An injector may be disposed in the injector port. An igniter may be disposed within the igniter port and in gaseous communication with the combustion chamber. A nozzle may be disposed on an aft portion of the casing body. A fuel port may be disposed on the casing body in fluid communication with the fuel chamber. A fluid flow path may be disposed between the fuel chamber and the injector, the injector being configured to meter the amount of fuel introduced into the combustion chamber. An exterior coating may be coated on an exterior surface of the casing body. A chassis may extend from the casing body. The chassis and casing body may be a single-piece structure having no bonded or bolted joints. The chassis may be a satellite chassis, a missile chassis, unmanned air vehicle (UAV) chassis, or a rocket chassis.

In another aspect, a propulsion system comprises: a casing body being a single-piece structure having no bonded or bolted joints, the casing body being at least partially composed of a material useful as a solid rocket fuel, the material useful as a solid rocket fuel includes at least one of polymethyl methacrylate (PMMA), high density polyethylene (HDPE), nylon plastic, nylon, nylon reinforced with carbon fiber or glass fiber, acrylonitrile butadiene styrene (ABS) plastic, polycarbonate, polyvinyl chloride (PVC), chlorinated polyvinyl chloride (CPVC), polybutylene (PB) and polyethylene (PE), polypropylene, hydroxyl-terminated polybutadiene (HTPB), polyurethane, and a photopolymer; and a combustion chamber being disposed within single-piece casing body, the combustion chamber extending between an injector port of the casing body and a nozzle.

Implementation may include one or more of the following features. A fuel chamber may be defined within the casing body and circumscribing at least a portion of the combustion chamber. An injector may be disposed in the injector port. An igniter port may be disposed on a forward portion of the casing body. An igniter may be disposed within the igniter port and in gaseous communication with the combustion chamber. A fuel port may be disposed on the casing body in fluid communication with the fuel chamber. A fluid flow path may be disposed between the fuel chamber and the injector, the injector being configured to meter the amount of fuel introduced into the combustion chamber. An exterior coating may be coated on an exterior surface of the casing body.

In another aspect, a method of making a propulsion system comprises additively manufacturing a casing body into a single-piece structure having no bonded or bolted joints, the casing body defining a combustion chamber therein, the casing body being at least partially composed of a material useful as a solid rocket fuel and capable of being consumed during combustion.

Implementation may include one or more of the following features. Additively manufacturing the casing body being at least partially composed of a material useful as a solid rocket fuel may include additively manufacturing the casing body of at least one of polymethyl methacrylate (PMMA), high density polyethylene (HDPE), nylon plastic, nylon, nylon reinforced with carbon fiber or glass fiber, acrylonitrile butadiene styrene (ABS) plastic, polycarbonate, polyvinyl chloride (PVC), chlorinated polyvinyl chloride (CPVC), polybutylene (PB) and polyethylene (PE), polypropylene, hydroxyl-terminated polybutadiene (HTPB), polyurethane, and a photopolymer. Additively manufacturing the casing body may include defining a fuel chamber within the casing body, the fuel chamber circumscribing at least a portion of the combustion chamber. Additively manufacturing the casing body may further comprise: additively manufacturing an injector port in a forward portion of the casing body; additively manufacturing a nozzle port in an aft portion of the casing body; and additively manufacturing the combustion chamber as extending between the nozzle port and the injector port. The method may further comprise additively manufacturing a chassis extending from the casing body, the chassis forming part of the single-piece structure. The method may further comprise coating a material on the exterior of the casing body. The method may coupling a plating on the exterior of the casing body.

In another aspect of the invention, a propulsion system comprises: a casing body being a single-piece structure having no bonded or bolted joints; a motor disposed within single-piece casing body; and a fuel chamber defined within the casing body and circumscribing at least a portion of the motor.

Implementation may include one or more of the following features. A chassis may extend from the casing body, the chassis and casing body may be a single-piece structure having no bonded or bolted joints. The chassis may be a satellite chassis, a missile chassis, rocket, or UAV (unmanned air vehicle) chassis. The fuel chamber may be substantially toroidal-shaped. The motor may include a combustion chamber defined within the casing body, the casing body may be at least partially composed of a material useful as a solid rocket fuel, the combustion chamber may extend from an injector port to a nozzle. A solid fuel may be disposed within the fuel chamber, an igniter port may be formed in a forward portion of the casing body, a nozzle may be disposed within an aft portion of the casing body, and a combustion chamber may be formed in the solid fuel, the combustion chamber may extend between the igniter port and the nozzle. The fuel chamber may be a first fuel chamber, and a second fuel chamber may be defined within the casing body and may circumscribe at least a portion of the motor. The motor may comprise: a combustion chamber; a first injector may be configured to inject a first fuel from the first fuel chamber into the combustion chamber; a second injector may be configured to inject a second fuel from the second fuel chamber into the combustion chamber; and a nozzle may be coupled to the combustion chamber. The casing body is may be composed of a material that includes at polymethyl methacrylate (PMMA), high density polyethylene (HDPE), nylon plastic, nylon, nylon reinforced with carbon fiber or glass fiber, acrylonitrile butadiene styrene (ABS) plastic, polycarbonate, polyvinyl chloride (PVC), chlorinated polyvinyl chloride (CPVC), polybutylene (PB) and polyethylene (PE), polypropylene, hydroxyl-terminated polybutadiene (HTPB), polyurethane, and a photopolymer, aluminum alloys, stainless steel alloys, nickel alloys, cobalt alloys, inconel alloys, magnesium alloys, copper alloys, or titanium alloys. It will be noted that stainless steel, nickel, cobalt, and inconel are all types of steel alloys.

In another aspect of the invention, a method of making a propulsion system comprises: additively manufacturing a casing body into a single-piece structure having no bonded or bolted joints, the casing body defining a fuel chamber therein, the casing body being configured to circumscribe at least a substantial portion of a motor; and providing a motor within the casing body that is at least partially circumscribed by the fuel chamber.

Implementation may include one or more of the following features. Providing the motor may include additively manufacturing at least a portion of the motor along with the casing body into the single-piece structure. The method may further comprise: additively manufacturing an injector port in a forward portion of the casing body; additively manufacturing a nozzle port in an aft portion of the casing body; additively manufacturing a combustion chamber extending between the nozzle port and the injector port; and additively manufacturing the at least a portion of the motor using a material useful as a solid rocket fuel. The method may further comprise additively manufacturing a chassis extending from the casing body, the chassis forming part of the single-piece structure.

In another aspect of the invention, a hybrid propulsion system comprises: a casing body being at least partially composed of a material useful as a solid rocket fuel; a combustion chamber defined within the casing body; a fuel chamber defined within the casing body and circumscribing at least a portion of the combustion chamber; and a chassis extending from the casing body, the chassis and casing body being a single-piece structure having no bonded or bolted joints.

Implementation may include one or more of the following features. An injector port may be disposed on a forward portion of the casing body. An injector may be disposed in the injector port; a nozzle may be disposed on an aft portion of the casing body. The combustion chamber may extend from the injector port to the nozzle. An igniter port may be disposed on a forward portion of the casing body. An igniter may be disposed within the igniter port and in gaseous communication with the combustion chamber. A fuel port may be disposed on the casing body in fluid communication with the fuel chamber. A fluid flow path may be disposed between the fuel chamber and the injector, the injector may be configured to meter the amount of fuel introduced into the combustion chamber. The material useful as a solid rocket fuel may include polymethyl methacrylate (PMMA), high-density polyethylene (HDPE), hydroxyl terminated polybutadiene (HTPB), or nylon plastic. The chassis may be at least one of a satellite chassis, a missile chassis, UAV chassis, or a rocket chassis. An exterior coating may be coated on an exterior surface of the casing body.

These and other features and advantages of the present invention may be incorporated into certain embodiments of the invention and will become more fully apparent from the following description and appended claims, or may be learned by the practice of the invention as set forth hereinafter. The present invention does not require that all the advantageous features and all the advantages described herein be incorporated into every embodiment of the invention.

BRIEF DESCRIPTION OF THE SEVERAL
VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. These drawings depict only typical embodiments of the invention and are not therefore to be considered to limit the scope of the invention.

DETAILED DESCRIPTION

Figure 1:
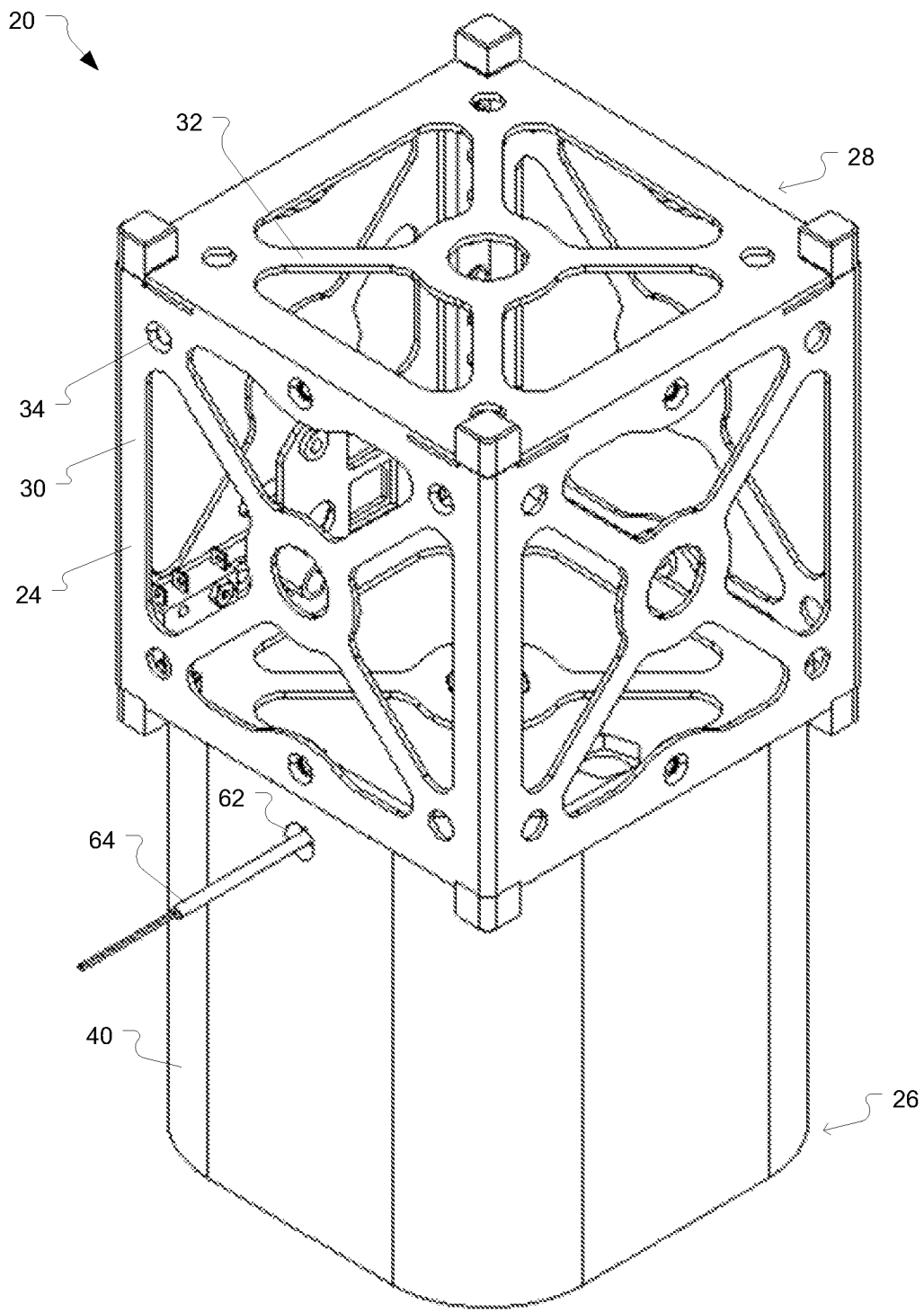
FIG. 1 is a perspective view of a propulsion system and an integrated chassis, according to some embodiments.

The presently preferred embodiments of the present invention can be understood by reference to the drawings, wherein like reference numbers indicate identical or functionally similar elements. It will be readily understood that the components of the present invention, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the invention.

The present invention relates to propulsion systems and specifically to a propulsion system formed as a single-piece structure in an additive manufacturing process. Additive manufacturing (also referred to occasionally as rapid prototyping) is the process of joining materials to make objects from 3D model data, usually layer upon layer (as opposed to subtractive manufacturing such as milling or turning on a lathe). In a non-limiting example of an additive manufacturing process, an object to be built is first modeled using a Computer-Aided Design (CAD) software package. Next, a file is uploaded to an additive manufacturing computer where the pre-processing software slices the model into a number of layers from, for instance, about 0.01 mm to about 0.7 mm thick, depending on the build technique. The additive manufacturing machine can then use a build material such as powdered plastics, powdered metals, or UV curable polymers, and evenly rolls out a thin layer across a build table. A laser can then fuse the material in the pattern of the first slice. The build table can then drop and the next layer of build material is rolled out and the process of laser sintering continues. Each layer is fussed or sintered to the last, thus building a solid object layer by layer. The excess powdered build material that is not sintered is left in place as support material that will help hold and support the object during the manufacturing process. This excess material is removed only after the manufacturing process is complete. Additive manufacturing objects allows for internal cavities and curved drill holes that are beneath the surface, which are difficult or impossible to manufacture using traditional subtractive manufacturing techniques. Because the additive manufacturing machine has no cutting tools, the complexity of the object being built may have little effect on the cost to manufacture. Additionally, by forming an object using this process, bonded or bolted joints (e.g. adhesively bonded joints, welded joints, and joints formed between a mechanical fastener such as a screw, bolt, etc.) can be absent from the resulting object, which can strengthen the object and reduce parts, cost, and assembly complexity. Accordingly, dynamic modeling can be greatly simplified using additive manufacturing processes. The various additive manufacturing process described herein can include the aforementioned process steps as well as other known process steps and future developed modifications to the additive manufacturing processes.

Reference will now be made generally to FIG. 1, which illustrates a propulsion system 20 made from an additive manufacturing process. Propulsion systems manufactured using additive manufacturing can be greatly enhanced because additive manufacturing allows all these features to be built into the structure as a single-piece structure. Thus, in some configurations, the propulsion system has no bonded, or bolted joints. Furthermore, the propulsion system may be improved since assembly procedures are greatly simplified and/or eliminated. Additive manufacturing of a propulsion system may also allow for responsive changes to the design that can support mission-specific or product-specific goals as called for by mission planners or product designers. These responsive changes can have little impact to cost and schedule because tooling and time to produce the propulsion system is not tied to any traditional manufacturing limitations; limitations such as machining internal cavities, sub-surface structural features, and physical size are all easily managed.

While various types of propulsion system 20 (e.g. rocket, missile, satellite, UAV, etc) can be prepared using an additive manufactured process, particular reference will be made herein to propulsion systems for industrial small satellites. Industrial small satellites can be launch into orbit alone or within extra space available when launching a larger satellite. Once in orbit, these industrial small satellites can be propelled away from the larger satellite, including into different orbits. Accordingly, industrial small satellites can include a propulsion system for propelling them between orbits and into position in space. Industrial small satellites can be manufactures in increments of 4 inches cubes. A 1U industrial small satellite is made to fit within a 10 $cm^3$ volume. A 2U industrial small satellite is made to fit within a 10 cm by 10 cm by 20 cm volume. A 3U industrial small satellite is made to fit within a 10 cm by 10 cm by 30 cm volume. Small satellites can be as large as 27U. Given the size constraints of such satellites, the ability to effectively use the given volume while still producing an effective satellite with sufficient ability to propel itself and have enough energy reserves can be advantageous. Accordingly, in some embodiments, at least some of the propulsion systems disclosed and illustrated herein can be used in industrial small satellites.

Accordingly, in some configurations, the propulsion system 20 can be used as an apogee motor. An apogee motor is used to boost a satellite from a temporary orbit to a geostationary (GEO) orbit. In some embodiments, the propulsion system 20 is used to raise the apogee or perigee of a satellite's orbit. In some embodiments, the propulsion system 20 is used to enable the a satellite when in orbit to make an inclination change also know as an orbital plane change which is an orbital maneuver aimed at changing the inclination of an orbiting body's orbit. In some embodiments, the propulsion system 20 can to be used with satellites having a mass of 1000 kilograms or less and would be used to move the satellite when in orbit.

The additive-manufactured propulsion system 20 can be additively manufactured using various materials including carbon fiber reinforced nylon plastic, aluminum alloys, steel alloys like stainless steel, inconel, nickel, etc, titanium, and other suitable materials used in additive manufacturing. These materials may have the ability to be plated with common plating materials like copper, nickel, and chrome. These materials can additionally or alternatively be coated with various high temperature exterior coatings. Accordingly, in some configurations, the propulsion system 20 is coated with an exterior coating on one or more or all of its exterior surfaces. The material used to manufacture the propulsion system can be both structurally strong as well as lightweight. These attributes can benefit the resulting propulsion system, which may be used to propel rockets, satellites, missiles, UAVs, and the like.

In some embodiments, the propulsion system 20 can include one or more fuel chamber 42 and motor. Fuel is feed from the one or more fuel chambers 42 to the motor, where it is combusted to produce thrust. The one or more fuel chambers 42 can be formed and defined within a casing body 40 that is manufactured as a single-piece structure using an additive manufacturing process. The motor generally includes a combustion chamber 44 and nozzle 52. In some embodiments, one or more components of the motor are manufactured into the single-piece structure using the additive manufacturing process. In other embodiments, only a portion of the motor or no portion of the motor is manufactured using an additive manufacturing process.

Integrated Motor and Chassis

Figure 2:
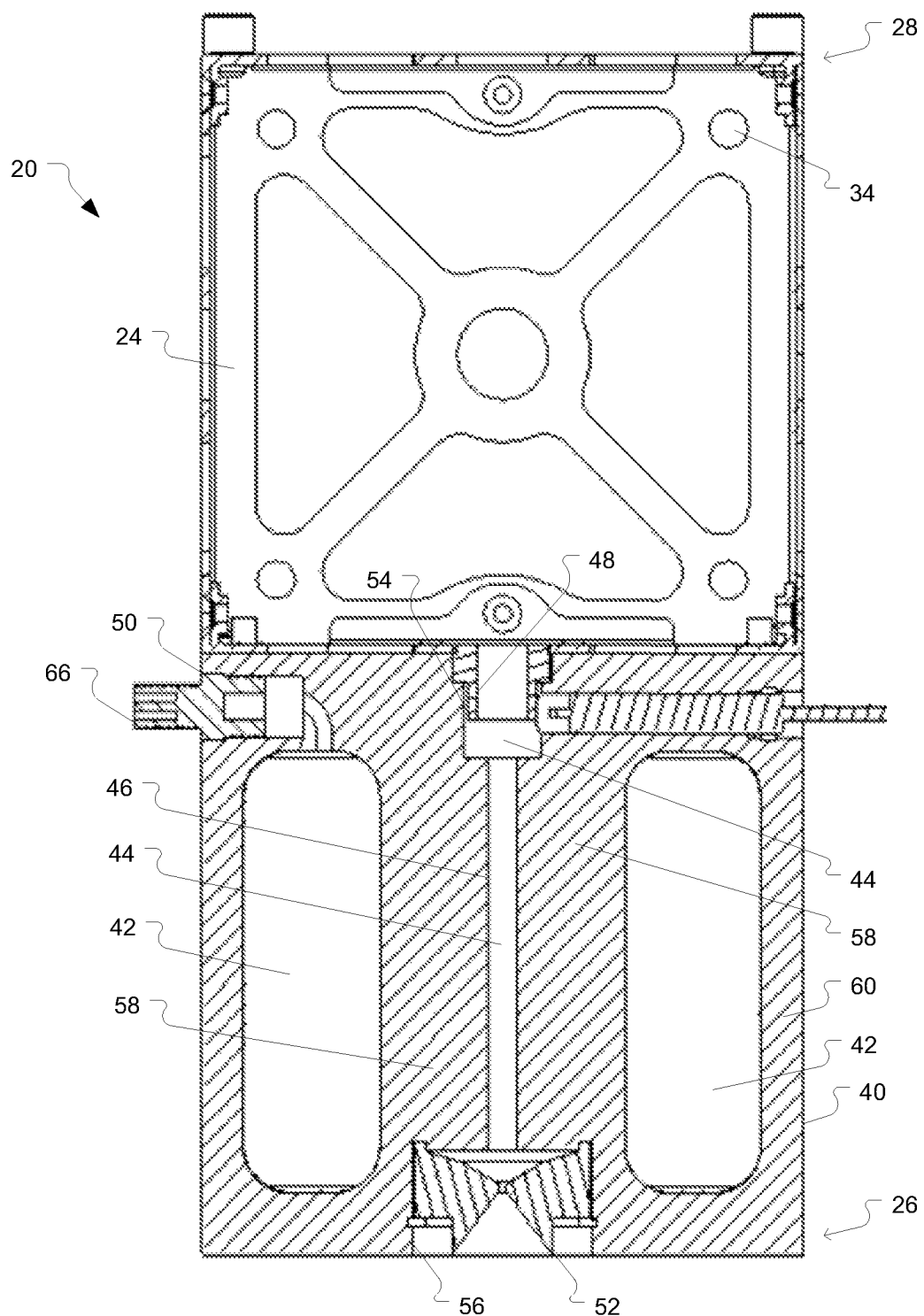
FIG. 2 is a cross section view of the propulsion system and an integrated chassis of FIG. 1.

Referring now specifically to FIGS. 1 and 2, in some embodiments, in addition to forming only a propulsion system 20 using an additive manufacturing process, in some embodiments, a chassis 24 or other body (herein the term chassis will include a body or other suitable structures) that is typically attached to a forward portion of the propulsion system 20 can be integrally manufactured (using the same additive manufacturing process) as part of the propulsion system 20 into a single-pieces structure. The single-pieces structure can generally include a propulsion system 20 forming its aft portion 26 and a chassis 24 forming its forward portion 28. In other embodiments, the chassis can additionally or alternatively be disposed on a side or aft portion of propulsion system 20. Representative chassis structures can include a satellite chassis, a rocket chassis, a UAV chassis, or a missile chassis. In a non-limiting example, as shown, the chassis 24 can be a satellite chassis for the satellite's electronics and the propulsion system can serve to propel the satellite in space. The chassis 24 can include various configurations, shapes, sizes, depending on the nature and intended use of the chassis 24. Furthermore, as described above the chassis along with the propulsion system 20 can be made of various materials. The chassis 24 can also include a coating, as explained above.

By incorporating a propulsion system 20 and a chassis structure 24 into a single additively manufactured part, the resulting single-piece chassis and propulsion system (herein also referred to as a single-piece structure) 20 can optimize flight performance, cost, manufacturing, and decrease time to manufacture. For example, when manufactured as a single-piece chassis and propulsion system 20, the single-piece structure can be optimized to deliver a relatively large amount of propulsive energy to the satellite since more mass can be used as propellant because less or no mass is used for bolted or bonded interfaces. In some configurations, when used with satellites, the single-piece structure can enable and/or enhance the satellite's ability to perform various maneuvers in space, such as changing orbits, increasing or decreasing apogee, increasing or decreasing perigee, and/or facilitating satellite de-orbiting.

The formation of the single-piece chassis 24 and propulsion system 20 can also permit previously unusable volume (where traditional subtractive manufacturing could not feasible manufacture) on satellites to be used, for example, as internal passageways for wiring and/or propellants routing can be formed beneath within the single-piece structure. In some instances, a space can be formed for one or more integrated electronic bays for one or more completed circuit assemblies. The single-piece formation can also provide electrostatic discharge dissipation of the motor and chassis, which can prevent the satellite, rocket, UAV, or missile from building up an electrical charge. In some embodiments, the single-piece structure can provide protection from electromagnetic interference and/or radio frequency radiation.

Various components and features can be coupled to or manufactured within the single-piece chassis and propulsion system 20. As shown, in some configurations, the chassis 24 can include one or more sets of support members 30, 32 that form a chassis structure. In other configurations, the chassis 24 is a solid body forming an enclosed or semi enclosed housing. In missile embodiments, the chassis can support one or more missile components and/or form an outer housing around the missile components.

For example, with satellite embodiments, the single-piece structure can include one or more features that help increase on orbit functionality, such as slosh baffles and capillary vapor barriers that can be integrated into the interior structure as part of the single-piece structure. In some configurations, the single-piece structure can have integrated solar panel frames for mounting solar panels. In some configurations, the single piece structure can have integrated attitude control thrusters that enable on-orbit positioning, de-tumbling, and maneuvering of the satellite. These control thrusters can use, for example, oxidizer gas from a main oxidizer motor tank to create thrust. These control thrusters do not burn the oxidizer in a combustion process but instead expel the gas through a valve thus creating thrust capable of moving the satellite in small precise increments. In some configurations, the single piece structure can have integrated mounting points 34 or rails (not shown) that assist in deployment of the satellite from the canister. In some configurations, the single-piece structure can have integrated mounting points 34 or rails that assist in holding the satellite inside the canister during launch.

Additively-Manufactured Propulsion System Using Hybrid Fuels

Reference will now be made specifically to the propulsion system 20 of FIGS. 1 through 6, which illustrate embodiments of a hybrid propulsion system. It will be understood that the chassis of FIGS. 1 and 2 can be included on any type of propulsion system 20 described herein, including a liquid and a solid propulsion system. The hybrid propulsion system 20 illustrated in FIGS. 1 and 2 is manufactured in combination with a chassis 24 using an additive manufacturing process to form a single-piece structure. The hybrid propulsion system 20 illustrated in FIGS. 3 through 6 is manufactured using an additive manufacturing process to form a single-piece propulsion system, however, as illustrated, the propulsion system 20 does not include an attached chassis 24.

The illustrated hybrid propulsion system 20 can combine aspects of both liquid systems and solid systems in that one propellant is stored as a solid and another propellant is stored as a liquid. In some embodiments, the solid material is used as the fuel and the liquid material is used as the oxidizer. A variety of materials can be used as the fuel, include, for example, polymethyl methacrylate (PMMA), high density polyethylene (HDPE), nylon plastic, nylon, nylon reinforced with carbon fiber or glass fiber, acrylonitrile butadiene styrene (ABS) plastic, polycarbonate, polyvinyl chloride (PVC), chlorinated polyvinyl chloride (CPVC), polybutylene (PB) and polyethylene (PE), polypropylene, hydroxyl-terminated polybutadiene (HTPB), polyurethane, a photopolymer, etc. Various materials and liquids can also be used as oxidizers, including nitrous oxide or other suitable materials and liquids. In some embodiments, the casing body 40 is entirely manufactured of a material useful as a solid fuel, such that the entire casing body 40 can act as a fuel source. In other embodiments, only a portion the casing body 40 is formed of a material useful as a fuel source. For example, only a portion of the casing body forming part of the motor can be formed of a material useful as a solid fuel.

Hybrid propulsion systems 20 can have characteristics that are desirable for some propulsion system. For example, a hybrid propulsion system 20 can have higher specific impulse than solid propulsion systems. Specific impulse is the change in momentum per unit mass for the rocket fuel. Thus, a hybrid propulsion system 20 may generate a higher level of force for each unit of fuel that is used than with solid propulsion systems. Another advantage associated with some hybrid propulsion systems is the separability of the fuel from the principal oxidizer. This can inhibit the potential for inadvertent ignition or catastrophic failure so that hybrid propulsion systems 20 are inherently immune to inadvertent explosion. Hybrid propulsion systems 20 can have the ability to easily start, stop, and restart the combustion of the rocket fuel, which can permit short, repetitive bursts, which can be useful in satellite systems.

Figure 3:
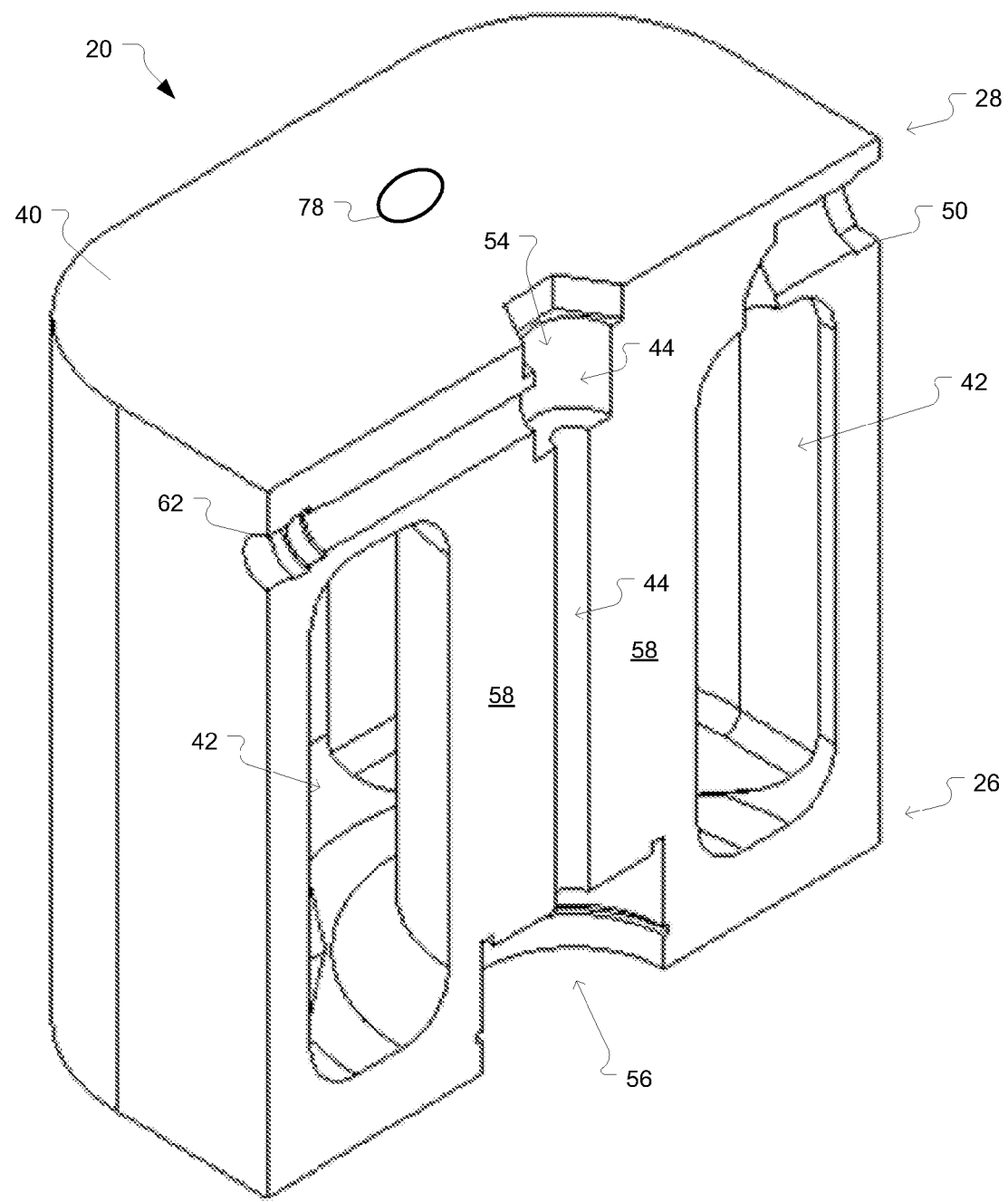
FIG. 3 is a cross section, perspective view of a hybrid propulsion system having no supporting components, according to some embodiments.
Figure 4:
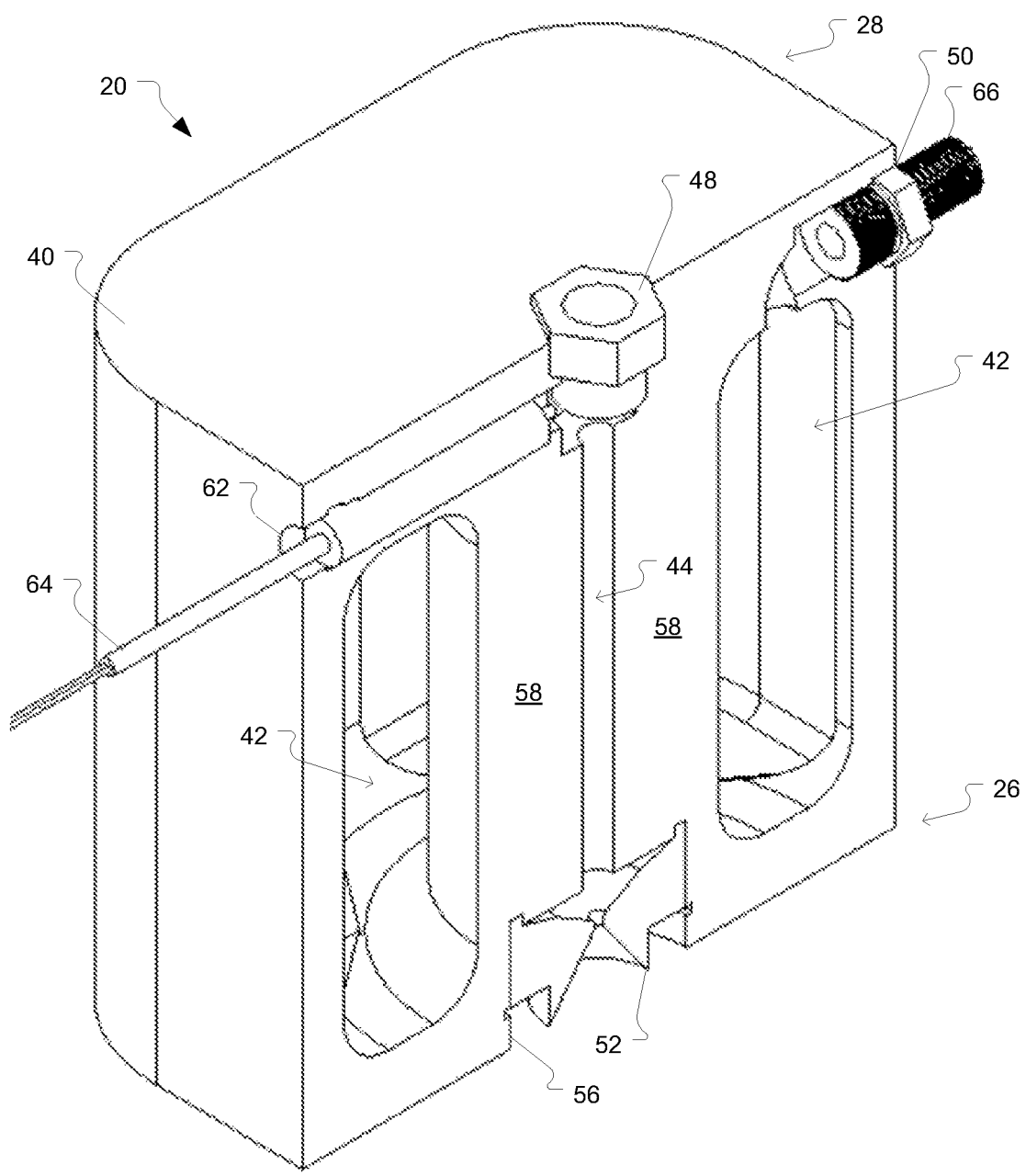
FIG. 4 is a cross section, perspective view of the hybrid propulsion system of FIG. 3 having supporting components, according to some embodiments.
Figure 5:
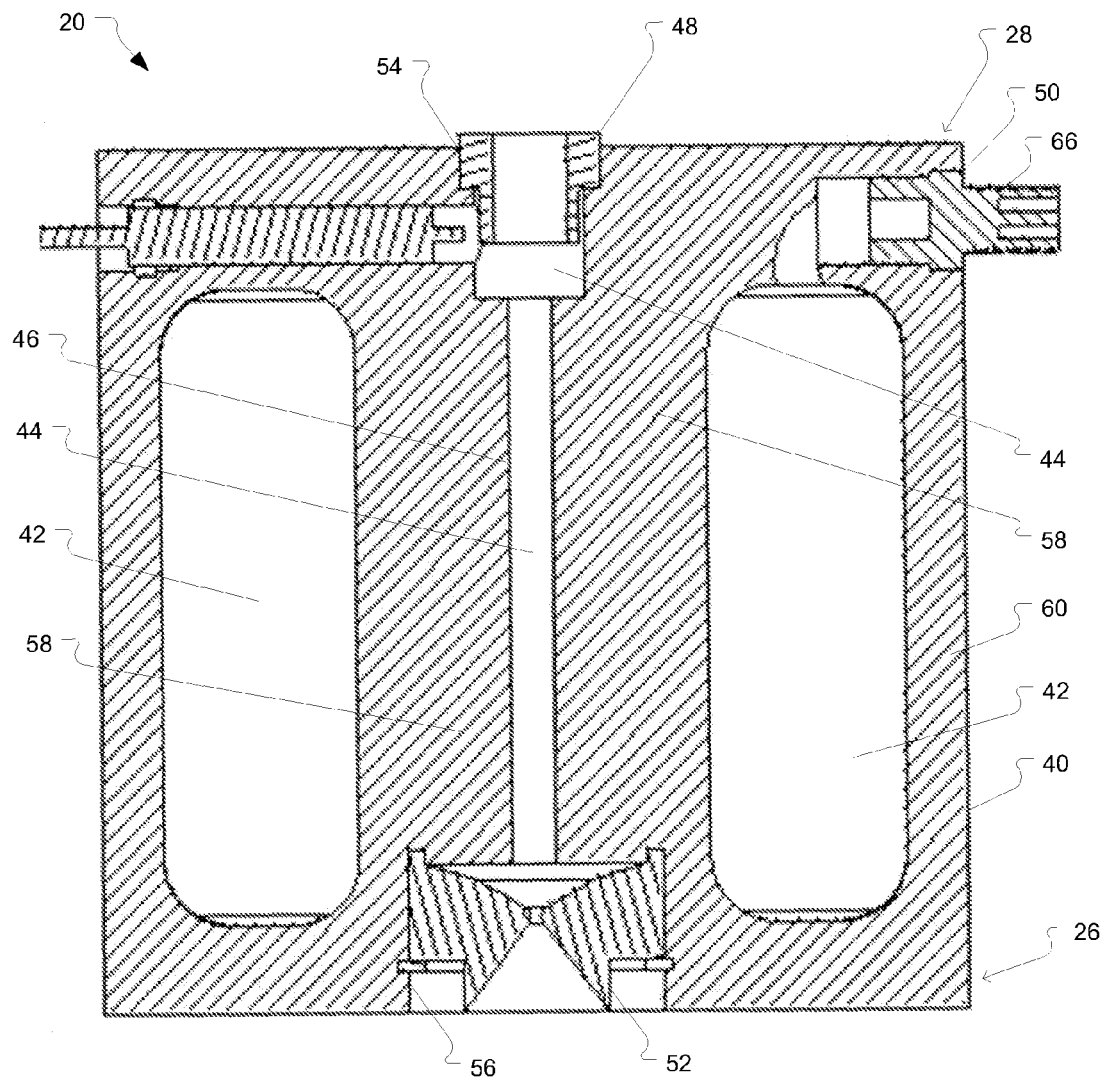
FIG. 5 is a cross section view of the hybrid propulsion system of FIG. 4.

Reference will now be made to the specific components of the hybrid propulsion system 20, as shown in FIGS. 2 through 5. For clarification, FIG. 3 illustrates a cross section, perspective view of a single-pieces casing body 20 having no supporting components. FIG. 4 is a cross section, perspective view of the single-pieces casing body 40 of FIG. 3 with the addition of supporting components. FIG. 5 is a cross section view of the propulsion system 40 of FIG. 4. The illustrated propulsion systems include the single-pieces casing body 40 that includes a fuel chamber 42 defined within the casing body 40. As shown, in some embodiments, the fuel chamber 42 circumscribes at least a portion of the motor. In hybrid propulsion system embodiments, the motor can include at least the motor case 58 and the combustion chamber 44. In some embodiments, the combustion chamber 44 extends between an igniter port 54 and a nozzle 52.

The hybrid propulsion system 20 can be made using the additive manufacturing process that allows all said features to be made as a single continuous piece. Using additive manufacturing it is possible to create internal cavities, such as the combustion chambers 44, and fuel chamber 42 that could not be fabricated using traditional subtractive manufacturing processes without forming joints within the system 20 or creating a multi-pieces structure.

In some embodiments, the hybrid propulsion system 20 can be designed to propel the satellite (e.g. an industrial small satellite) in space. The propulsion system 20 can include a casing body 40 that forms the exterior and interior components of the propulsion system 20, with other components formed or inserted therein. For instance, in some instances, one or more combustion chambers 44 are formed within the casing body 40, such as a forward combustion chamber and a central combustion chamber. A fuel chamber 42 can also be formed therein, such as an oxidizer tank. In some embodiments, a fuel chamber 42 circumscribes at least a portion of the one or more combustion chambers, which forms part of the motor of the propulsion system 20. In some embodiments, a fuel chamber 42 is purely or substantially toroidal-shaped, which includes not perfect toroidal shapes, such as square-donut shapes, rectangle-donut shapes (these may include rounded edges and/or straight sides and/or edges), and other such semi-toroidal-shapes. In some embodiments, a fuel chamber 42 is formed around the exterior of the casing body 40, and other components are formed within the interior of the oxidizer tank. In some configurations, the system 20 can include one or more ports wherein one or more supporting components can be coupled to the casing body 40, such ports may include an igniter port 54, pressure transducer port (not shown), oxidizer tank port 50, and/or a thrust nozzle port 56. The system 20 can also include internal passageways. Such ports and passageways can be formed into the casing body 40.

The thrust nozzle 52 can be integrally formed as part of the one-piece casing body 40 or as a separate unit. The thrust nozzle 52 (not shown installed into the thrust nozzle port 56), can be of a conventional geometry and be molded or otherwise fabricated from a high temperature material such as graphite, phenolic, ceramic, or the like. Regardless of the material chosen for the thrust nozzle 52, the material can be substantially shape sustaining for the full duration of time when the system 20, is operating.

In some embodiments, at least a portion of the interior surface of the one or more combustion chambers 44 is lined with or formed within a fuel grain 46. By extending the one or more combustion chamber 44 through the fuel gain 46, combustion can be more effectively managed and enhanced, than if the combustion chambers did not extend therethrough. In some embodiments, the fuel grain is the same material used to construct the entire casing body 40 in the additive manufacturing process. In other embodiments, the fuel grain 46 material is a different material that is used to manufacture to remainder of the casing body 40, but is manufactured in the same additive manufacturing process and forms part of the single-piece casing body 40. Non-limiting, representative material useful as fuel grain 46 include polymethyl methacrylate (PMMA), high density polyethylene (HDPE), nylon plastic, nylon, nylon reinforced with carbon fiber or glass fiber, acrylonitrile butadiene styrene (ABS) plastic, polycarbonate, polyvinyl chloride (PVC), chlorinated polyvinyl chloride (CPVC), polybutylene (PB) and polyethylene (PE), polypropylene, hydroxyl-terminated polybutadiene (HTPB), polyurethane, and a photopolymer. When the casing body is made of the same material as is used for the fuel grain 46, the motor case 58 can be made of a seamless construction such that the likelihood of leak paths is reduced or eliminated.

In some instances, when casting the fuel grain 46 as part of a single-pieces casing body 40, a mandrel that includes all of the features of the interior port of the fuel grain is used. Once the fuel grain body 320, is cured the mandrel is then removed leaving a longitudinal port, the complete length of the casing body 40.

The fuel chamber 42 can be formed in such a way that it encapsulates the integrated motor case 58 that encloses the combustion chamber 44, the fuel grain 46, the thrust nozzle port 56, the injector port 54, and all other potential features of the system 20 into a single-piece component. By disposing the central combustion chamber 44 with the fuel chamber 42, the propulsion system 20 can be more compact than otherwise. This placement can also reduce the liner length of the propulsion system.

The fuel chamber 42 can have a known volume where an oxidant propellant is stored. In some embodiments, the fuel chamber 42 is configured to contain an oxidizer, such as, Nitrous Oxide (N2O) or some other type of oxidizer for use as the liquid propellant. Nitrous Oxide and similar liquid propellants can be useful because they are self-pressurizing at room temperature. Accordingly, the high vapor pressure of the Nitrous Oxide can be utilized in the fuel chamber 42 to transport the Nitrous Oxide to the combustion chamber 44 via the oxidizer tank port 50, the oxidizer valve (not shown), and the injector. In other embodiments, the liquid propellant is transported to the combustion chamber via one or more internal passageway (not shown), In some instances, this method of oxidizer transport does not require pumps or a separate pressurization system.

In some embodiments, the fuel chamber 42 and/or combustion chamber 44 include one or more slosh baffles (not shown) that are built-in as a single piece to the fuel chamber 42 and/or combustion chamber 44. This baffle can limits the movement of the fluid and thus helping to stabilize the propulsion system 20 when in orbit or in flight. The baffle can helps to locate the liquid fuel for use in the propulsion system 20.

In some embodiments, the fuel chamber 42 is additive manufactured from a single material having a relatively thin exterior wall 60. The entire casing body 40 or a portion thereof can be coated, wrapped, or otherwise surrounded with an outer casing (not shown) formed of a different material that provides structural strength to the exterior wall 60. The wrapping material can be any type of suitable material, such as, for example, a composite such as carbon-epoxy, fiberglass epoxy, Kevlar epoxy, copper, nickel, or chrome. It will be noted that copper nickel and chrome can be used as plating materials and the carbon, fiberglass, and kevlar epoxy can be coated on the casing body 40 to add strength to the design.

In some embodiments, the hybrid propulsion system 20 has one or more injectors 48 that are a separate part that inserts into the injector port 54 and introduces and meters the flow of fuel (e.g. a liquid or gas oxidizer propellant) into the combustion chamber 44 and distributes and mixes the oxidizer propellant with the fuel. The injector 48, typically located at the forward end of the fuel grain, can include a threaded body and an aft-directed orifice that extends through the entire length of the injector. The injector can communicates with the oxidizer tank through a valve and tubing to deliver the oxidizer propellant to the forward combustion chamber.

In some embodiments, the hybrid propulsion system 20 has a fuel feed port 78 (shown in FIG. 3) formed therein. The fuel feed port 78 can be fluidly coupled to the fuel chamber 42 to withdraw fuel therefrom and communicate it to the injector for injection into the combustion chambers 44. In some embodiments, the hybrid propulsion system 20 includes a pressure release valve (not shown) inserted into a pressure release port (not shown) of the casing body. The pressure release port can be in fluid communication with the fuel chamber 42, and the pressure release valve can be configured to release fuel if the internal pressure of the fuel chamber 42 exceeds a threshold amount.

In some embodiments, the hybrid propulsion system 20 has one or more igniters 64 as a supporting component that is installed into the propulsion system 20 that generates heat and transfers it to the motor fuel grain surface. The heat generated by the igniter 64 starts the propellants burning inside the one or more combustion chambers 44. The igniter 64 can be inserted into the igniter port 54 that lends access to the combustion chamber 44 via an internal additive manufactured port.

In some embodiments, the hybrid propulsion system 20 has one or more integrated mounting points that can attach the hybrid motor to a satellite structure.

The hybrid propulsion system 20 functions when first the fuel chamber 42 is filled with an oxidant propellant. Nitrous Oxide is one such oxidant propellant that could be used and it is self-pressurizing. In some embodiments, with an injector 48, igniter 64, oxidizer valve (not shown), thrust nozzle 52 installed, the hybrid propulsion system 20 is ready for use. In some instances, a single electric pulse to the igniter 64 can start the igniter burning. In some instances, a second electric pulse to the oxidizer valve can open the valve and allow the oxidizer to flow to the injector and on through to the combustion chamber 44, the fuel grain 46 with the now injected oxidizer will ignite and burn creating hot gas that is channeled to the thrust nozzle 52 where it is accelerated to, for example, mach one and greater, which creates reactive force or thrust that propels whatever is attached to the propulsion system 20. The additive manufactured hybrid propulsion system 20 can capable of being turned on and off by closing and opening the oxidizer valve and by reactivating the igniter. This feature can allow the propulsion system 20 to be used incrementally or all at once. In some configurations, the hybrid propulsion system 20 can be restarted multiple times by opening and closing the oxidizer valve and turning on and off the igniter. In some configurations, the hybrid propulsion system 20 can have thrust vectoring of the exhaust gases by inserting into the gas flow an object that changes the direction of the hot gas. In some configurations, the hybrid propulsion system 20 can be throttled up or down by controlling the flow of oxidizer through the oxidizer valve.

Additive Manufactured Propulsion System Using Liquid Fuels

Figure 6:
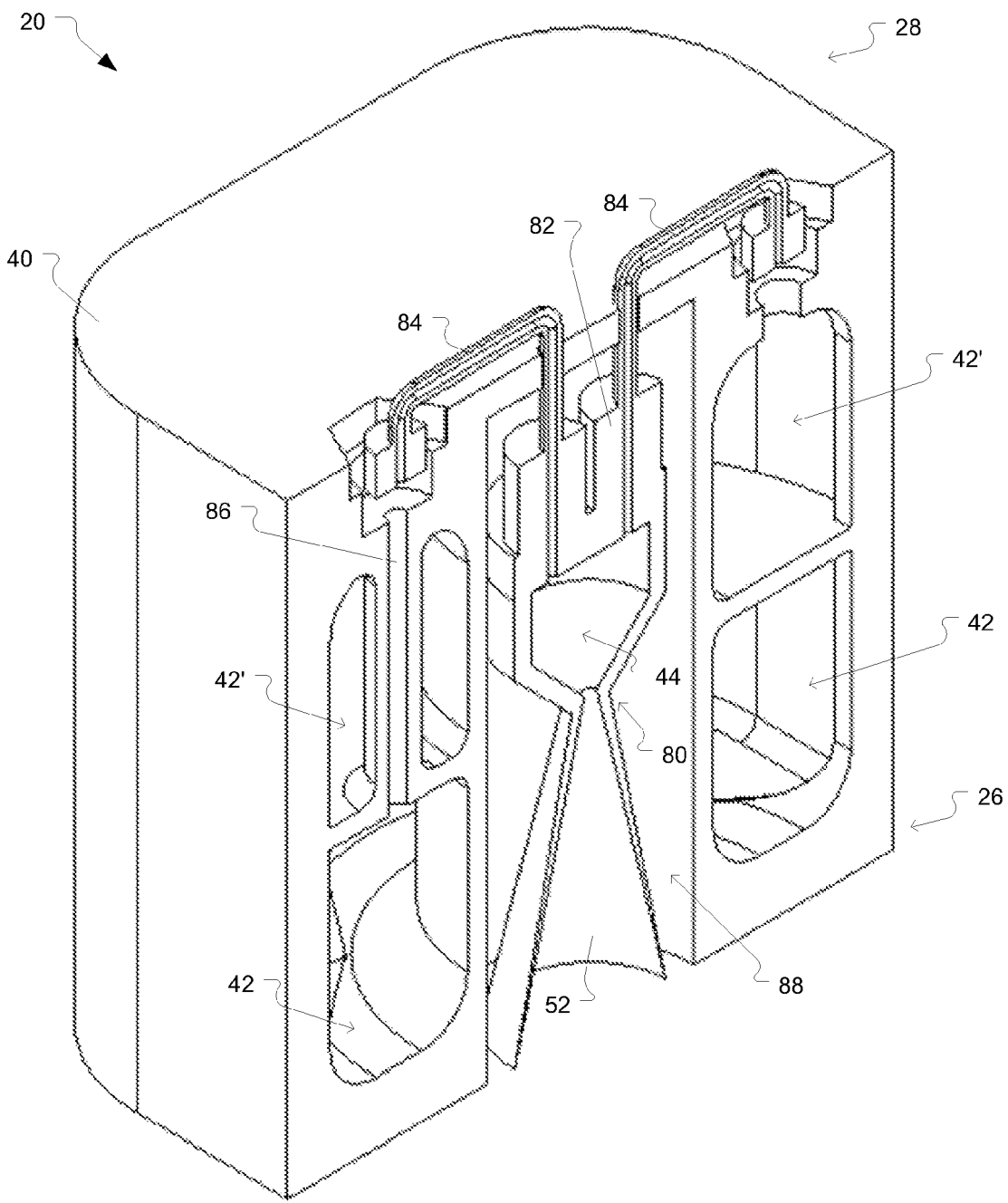
FIG. 6 is a cross section, perspective view of a liquid propulsion system having a motor installed within a single-piece casing body, according to some embodiments.
Figure 7:
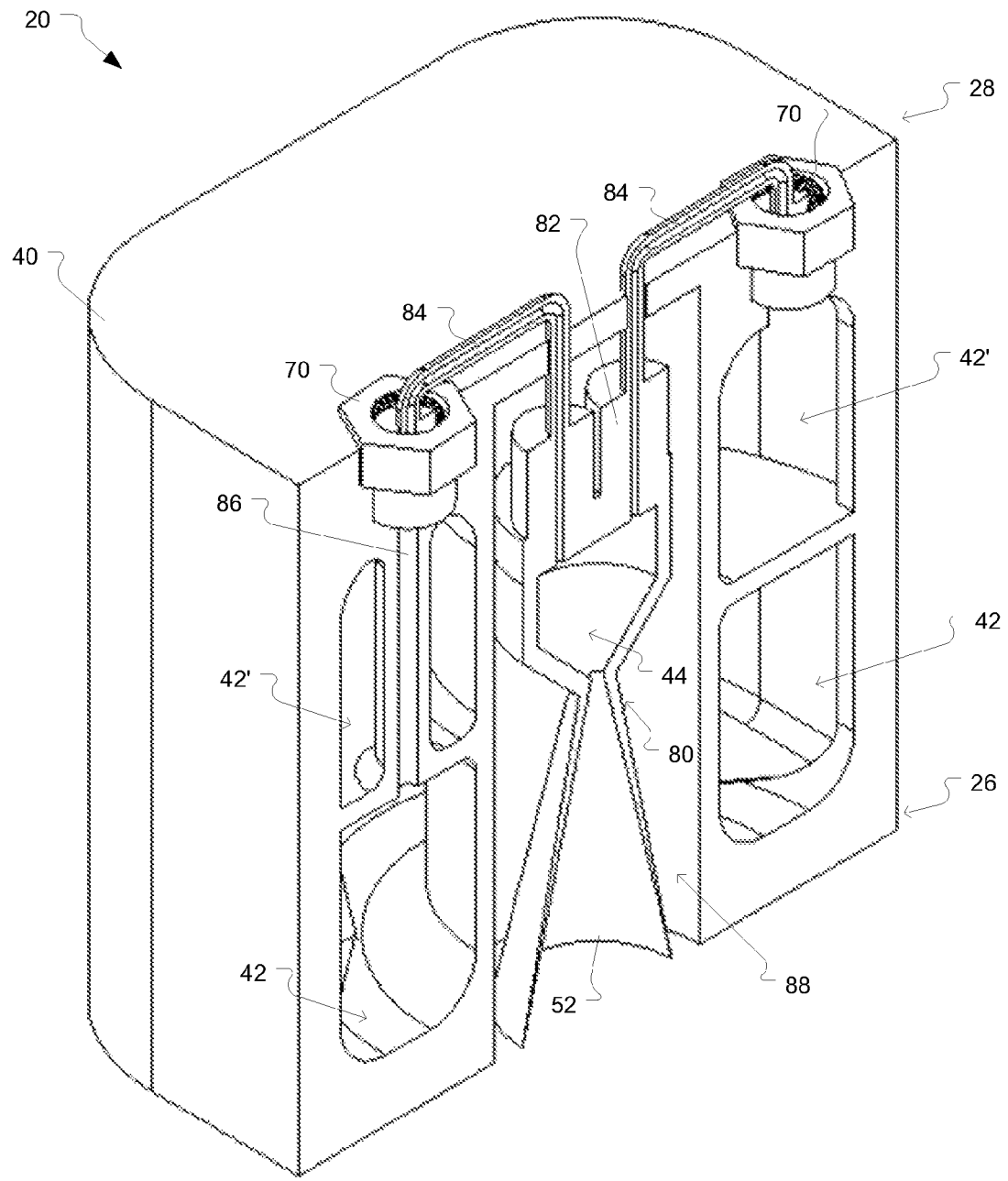
FIG. 7 is a cross section, perspective view of another liquid propulsion system having a motor installed within a single-piece casing body, according to some embodiments.
Figure 8:
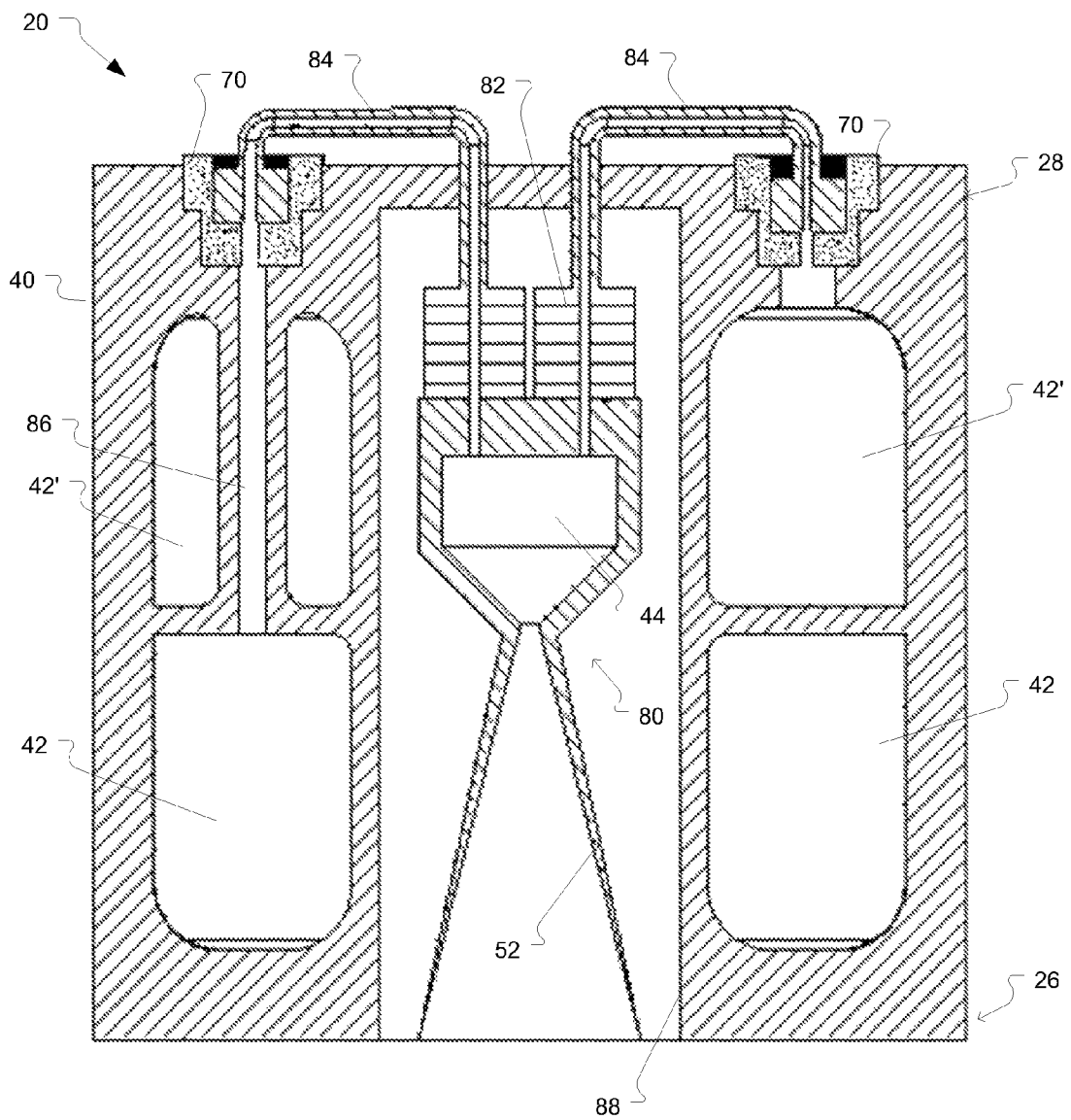
FIG. 8 is a cross section view of the liquid propulsion system of FIG. 7.

Referring now to FIGS. 6 to 8, in some embodiments, the propulsion system 20 is configured to use a liquid fuel and liquid oxidizer, each of which are stored in separate fuel chambers 42, 42'. As shown, the liquid propulsion system 20 can include a casing body 40 that is a single-piece structure. The casing body 40 can define a one or more fuel chambers 42, 42' therein, which can circumscribe an engine (which is also herein referred to generally as a motor) 80. The engine 80 can be a separate component that is inserted into the casing body 40, as shown in FIG. 6, and coupled thereto, as shown in FIGS. 7 and 8.

In some embodiments, in the liquid propulsion system 20, a liquid fuel and a liquid oxidizer can fed through a system of pipes, valves, and/or turbo-pumps or other fuel communication lines 84 to a combustion chamber 44 where they are combined and burned to produce thrust. A thrust nozzle 52 can be coupled to the combustion chamber. With some embodiments of a liquid propulsion system 20, the engine 80 can be ignited multiple times and can have the ability to easily start, stop, and restart the combustion of the rocket fuel. With some embodiments, the liquid propulsion system can have thrust vectoring of the nozzle, and the engine's thrust can be throttled.

In some embodiments, the engine 80 of the propulsion system 20 is not formed during the additive manufacturing process, but is later inserted within a cavity 88 of the casing body 40. The cavity 88 can be formed within the casing body 40 during the additive manufacturing process. The cavity 88 can be shaped and sized to contain the engine 80 with varying sized gaps therebetween or no gaps at all. As shown, in some embodiments, both of the fuel chambers 42, 42' and a substantial portion of the casing body 40 circumscribe at least a portion of the motor 80. The motor 80 can include at least the combustion chamber 44, a first and second injector 82, and the nozzle 52. The first and second injectors 82 can be configured to inject fuel or propellants (including oxidizer) into the combustion chamber. In some embodiments, the propulsion system 20 can have internal propellant tubes that direct the flow of propellants to the combustion chamber. In some embodiments, the liquid propulsion system 20 can use self-pressurizing propellants and avoid the need for high-pressure helium tanks or pumps.

As shown in FIGS. 6 to 8, the propulsion system can include two, or potentially more than two, fuel chambers 42, 42'. These two fuel chambers 42, 42' can be formed during the additive manufacturing process and can be defined by the casing body 40. As shown, the two fuel chambers 42, 42' can be formed adjacent one another, with a first fuel chamber 42 being in an aft portion of the casing body 40 and a second fuel chamber 42' being in the forward portion of the casing body 40. In other embodiments, a first fuel chamber 42 is disposed at least partially inside of the second fuel chamber 42'. In other embodiments, the first fuel chamber 42 and the second fuel chamber 42' are concentrically arranged with a first fuel chamber 42 being formed on an interior portion of the casing body 40 and the second fuel chamber 42' being formed on an exterior portion of the casing body 40. Although the terms first and second fuel chambers are used, it will be understood that either chamber cam include either fuel or oxidizer. In some embodiments, the first and the second fuel chambers 42, 42' can be have a substantially toroidal shape or a purely toroidal shape.

Liquid propellant engines (which are herein referred to as motors) can offer several advantages. For example, by controlling the flow of propellant to the combustion chamber 44, the engine can be throttled, stopped, and/or restarted. A good liquid propellant is one with a high specific impulse or, stated another way, one with a high speed of exhaust gas ejection. This implies a high combustion temperature and exhaust gases with small molecular weights. In some instance, the density of the propellant may need to be taken into consideration. Using low density propellants may means that a larger storage tanks is needed, this can, in some instances, increase the mass of the launch vehicle. Storage temperature may also need to be considered. A propellant with a low storage temperature, i.e. a cryogenic, may require thermal insulation, which can increase the mass of the launcher. The toxicity of the propellant may also need to be considered. Safety hazards can exist when handling, transporting, and storing highly toxic compounds. Some propellants can be very corrosive. However, materials that are resistant to certain propellants have been identified for use in rocket construction and can be used with embodiments of the propulsion system. Liquid propellants used in rocketry can be classified into three types: petroleum, cryogens, and hypergolics.

Additively Manufactured Propulsion System using Solid Fuels

Figure 9:
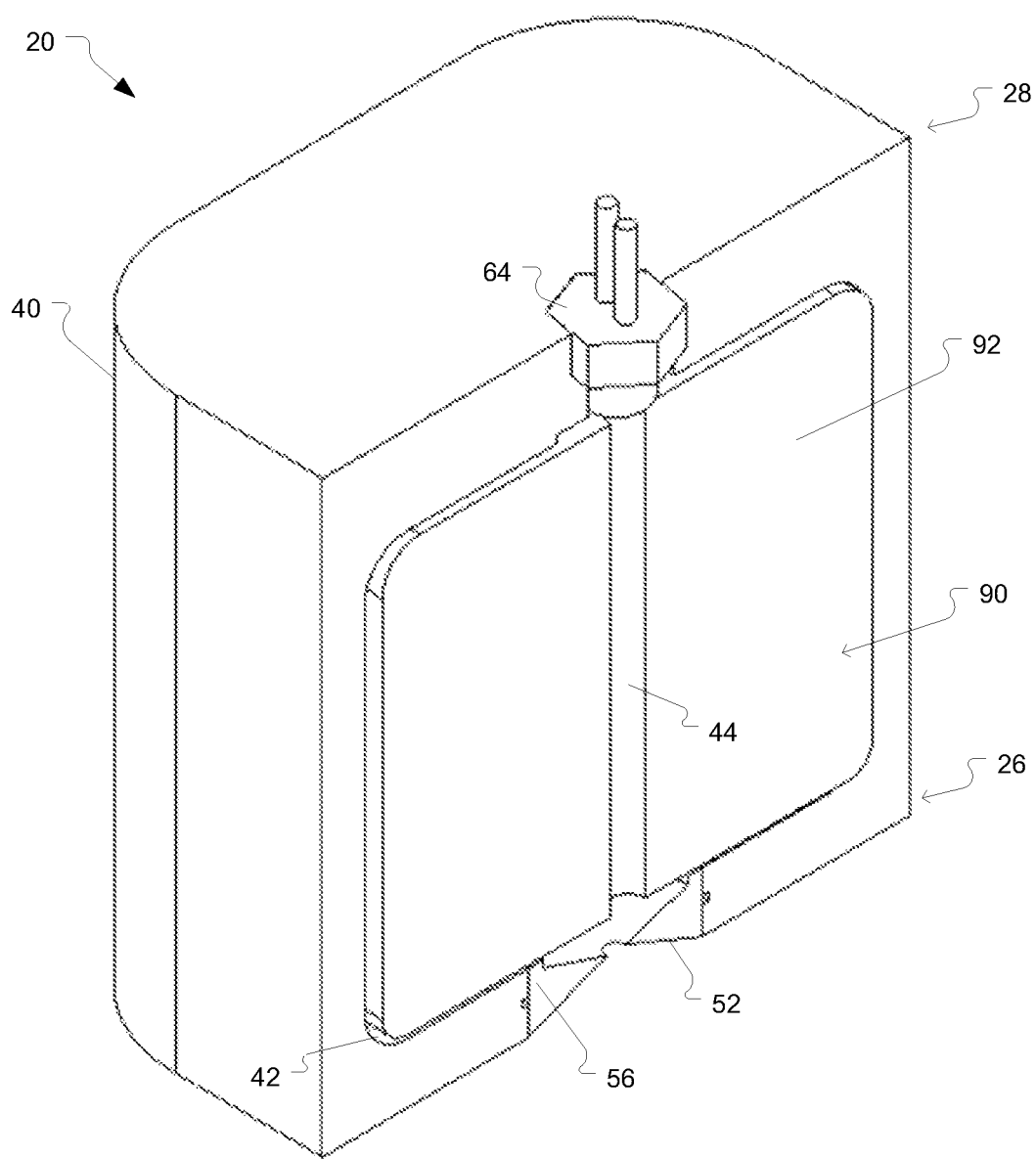
FIG. 9 is a cross section, perspective view of a solid propulsion system, according to some embodiments.
Figure 10:
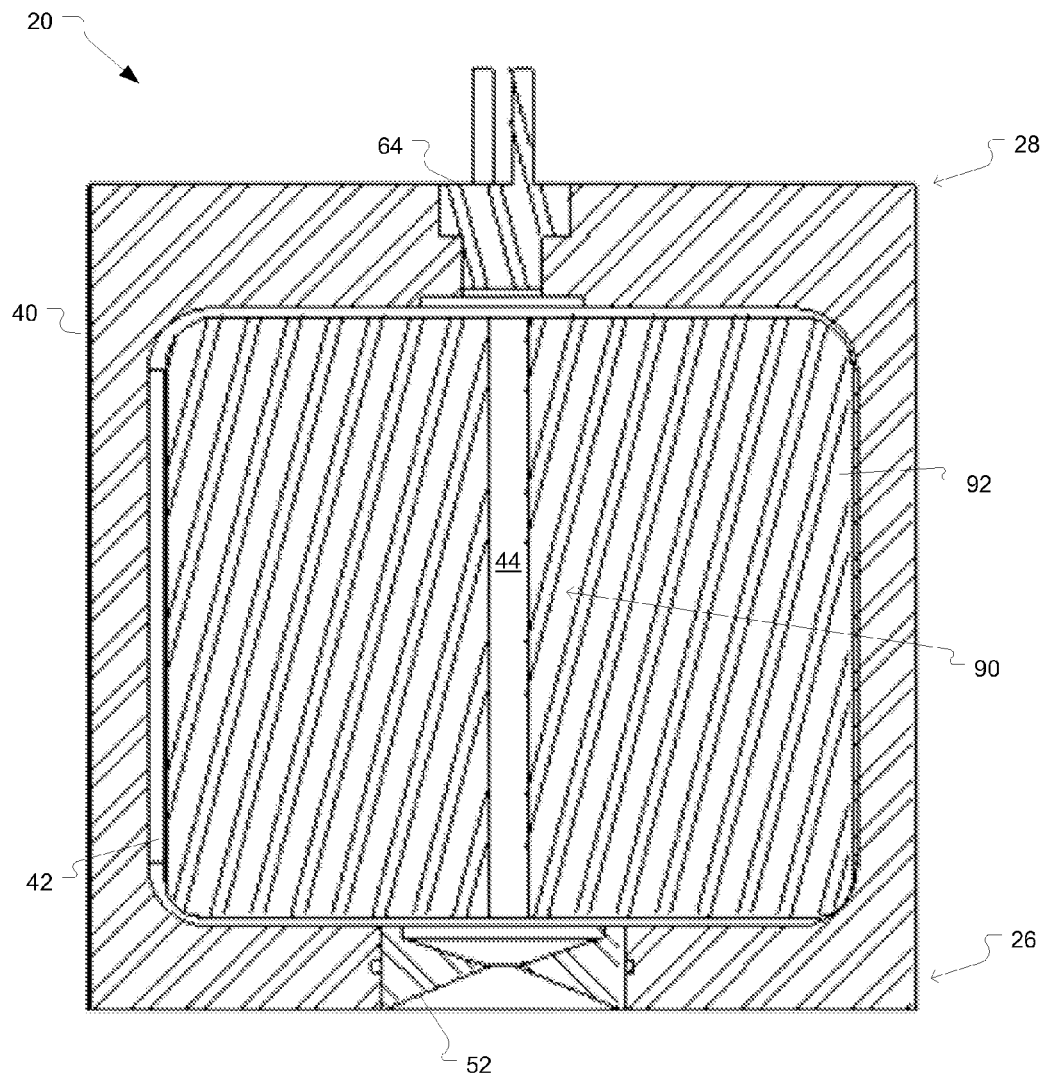
FIG. 10 is a cross section view of the solid propulsion system of FIG. 9.

Referring now to FIGS. 9 and 10, in some embodiments, the propulsion system 20 includes a solid fuel motor that does not use liquid fuels or oxidizers, but with uses a solid fuel 90. Such solid fuel propulsion systems 20 can include a casing body 40 that is additively manufactured. In some embodiments, the casing body 40 defines and internal fuel chamber 42. The casing body 40 can include an ignition port 62 configured to receive an igniter 64 and a nozzle port 56 configured to receive a nozzle 52. After the casing body 40 is additively manufactured, the motor 90 can be installed therein. In some embodiments, the motor 90 includes at least the solid fuel 92, a combustion chamber 44 formed within the solid fuel 92. The casing body 40 can include a fuel chamber 42 into which the solid fuel 92 is placed within and circumscribed by the fuel chamber 42.

When the fuel chamber 42 is filled with a mixture of solid compounds, (comprising fuel and oxidizer) it can be ignited and burn at a rapid rate, expelling hot gases from a nozzle 52 to produce thrust. When ignited, the solid fuel (or propellant) 92 can burn from the center out towards the sides of the casing body 40. The shape of the center channel determines the rate and pattern of the burn, thus providing a means to control thrust. In some embodiments, the combustion chamber 44 is formed to have a star-shaped cross section.

The solid fuel 92 can be either a homogeneous propellant or a composite propellant. Homogeneous propellants are either simple base or double base. A simple base propellant consists of a single compound, usually nitrocellulose, which has both an oxidation capacity and a reduction capacity. Double base propellants may consist of nitrocellulose and nitroglycerine, to which a plasticiser is added. Homogeneous propellants do not usually have specific impulses greater than about 210 seconds under normal conditions. Their main asset is that they do not produce traceable fumes and are, therefore, commonly used in tactical weapons. They are also often used to perform subsidiary functions such as jettisoning spent parts or separating one stage from another. Any of the aforementioned types of homogeneous propellants can be used with the propulsion system 20.

Modern composite propellants are heterogeneous powders (mixtures) which use a crystallized or finely ground mineral salt as an oxidizer, often ammonium perchlorate, which constitutes between 60% and 90% of the mass of the propellant. The fuel itself is generally aluminum. The propellant is held together by a polymeric binder, usually polyurethane or polybutadienes, which is also consumed as fuel. Additional compounds are sometimes included, such as a catalyst to help increase the burning rate, or other agents to make the powder easier to manufacture. The final product is rubberlike substance with the consistency of a hard rubber eraser. Any of the aforementioned types of composite propellants can be used with the propulsion system 20.

In some embodiments, as explained above, the solid fuel propulsion system 20 can be wrapped with carbon fiber for added strength. Can also be plated with high temperature materials and can be plated with various metals.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A propulsion system, comprising:
   a casing body consisting of a material useful as a solid rocket fuel and capable of being consumed during combustion;
   a combustion chamber defined within the casing body; and
   a fuel chamber defined within the casing body and circumscribing at least a portion of the combustion chamber, the fuel chamber storing an oxidizer prior to the oxidizer being injected into the combustion chamber, wherein the casing body includes an oxidizer outlet port which outlets oxidizer from the casing body prior to being injected into the combustion chamber.

2. The propulsion system of claim 1, wherein the material useful as a solid rocket fuel includes at least one of polymethyl methacrylate (PMMA), high density polyethylene (HDPE), nylon plastic, nylon, nylon reinforced with carbon fiber or glass fiber, acrylonitrile butadiene styrene (ABS) plastic, polycarbonate, polyvinyl chloride (PVC), chlorinated polyvinyl chloride (CPVC), polybutylene (PB) and polyethylene (PE), polypropylene, hydroxyl-terminated polybutadiene (HTPB), polyurethane, and a photopolymer.

3. The propulsion system of claim 1, further comprising:
an igniter port disposed on a forward portion of the casing body; and
an injector port disposed on a forward portion of the casing body.

4. The propulsion system of claim 3, further comprising:
an injector disposed in the injector port;
an igniter disposed within the igniter port and in gaseous communication with the combustion chamber; and
a nozzle disposed on an aft portion of the casing body.

5. The propulsion system of claim 4, further comprising:
a fluid flow path disposed between the fuel chamber and the injector, the injector being configured to meter the amount of fuel introduced into the combustion chamber.

6. The propulsion system of claim 1, further comprising an exterior coating coated on an exterior surface of the casing body.

7. A propulsion system, comprising:
a casing body being a single-piece structure having no bonded or bolted joints, the casing body consisting of a material useful as a solid rocket fuel, the material useful as a solid rocket fuel includes at least one of polymethyl methacrylate (PMMA), high density polyethylene (HDPE), nylon plastic, nylon, nylon reinforced with carbon fiber or glass fiber, acrylonitrile butadiene styrene (ABS) plastic, polycarbonate, polyvinyl chloride (PVC), chlorinated polyvinyl chloride (CPVC), polybutylene (PB) and polyethylene (PE), polypropylene, hydroxyl-terminated polybutadiene (HTPB), polyurethane, and a photopolymer; and
the casing body forming a combustion chamber that extends between an injector port of the casing body and a nozzle, the casing body further forming a fuel chamber that circumscribes at least a portion of the combustion chamber, the fuel chamber storing an oxidizer prior to the oxidizer being injected into the combustion chamber, wherein the casing body includes an oxidizer outlet port which outlets oxidizer from the casing body prior to being injected into the combustion chamber.

8. The propulsion system of claim 7, further comprising:
an injector disposed in the injector port;
an igniter port disposed on a forward portion of the casing body; and
an igniter disposed within the igniter port and in gaseous communication with the combustion chamber.

9. The hybrid propulsion system of claim 8, further comprising:
a fluid flow path disposed between the fuel chamber and the injector, the injector being configured to meter the amount of fuel introduced into the combustion chamber.

* * * * *